United States Patent
Dehn et al.

[11] Patent Number: 5,843,206
[45] Date of Patent: Dec. 1, 1998

[54] DEVICE FOR AND METHOD OF UNCLOGGING FILTERS

[75] Inventors: Günther Dehn, Wesel; Joachim Schmitt, Neukirchen Vluyn, both of Germany

[73] Assignee: LLB Lurgi Lentjes Babcock Energietechnik GmbH, Dusseldorf, Germany

[21] Appl. No.: 687,230

[22] Filed: Jul. 25, 1996

[30] Foreign Application Priority Data

Oct. 21, 1995 [DE] Germany .................. 195 39 277.9

[51] Int. Cl.⁶ .................................................. B01D 29/068
[52] U.S. Cl. .................................. 95/26; 95/280; 55/283; 55/302; 96/428
[58] Field of Search .................. 95/280, 26; 55/283, 55/272, 302, 284, 271, 210, 212, 341.1, 341.2; 210/332, 333.01, 333.1; 96/425, 426, 427, 428, 397, 399, 405

[56] References Cited

U.S. PATENT DOCUMENTS

| | | | |
|---|---|---|---|
| 4,433,986 | 2/1984 | Borst | 55/283 |
| 4,500,435 | 2/1985 | Müller | 210/333.01 |
| 5,348,572 | 9/1994 | Jelich et al. | 55/283 |
| 5,531,798 | 7/1996 | Engstrom et al. | 95/280 |
| 5,643,455 | 7/1997 | Kopp et al. | 210/333.01 |

FOREIGN PATENT DOCUMENTS

| | | | |
|---|---|---|---|
| 27 09 204 | 9/1978 | Germany | 95/280 |
| 43 417 | 1/1982 | Germany | 95/280 |
| 5-59828 | 3/1993 | Japan | 95/280 |
| 899090 | 1/1982 | Russian Federation | 55/302 |

*Primary Examiner*—Jay H. Woo
*Assistant Examiner*—Robert Hopkins
*Attorney, Agent, or Firm*—Max Fogiel

[57] ABSTRACT

A device for unblocking filters by means of bursts of gas. The gas is kept in a tank (7) and supplied to filter-unclogging lances by lines (8). Each line (8) accommodates several valves (11 & 12) parallel with respect to their intakes and outlets. Controls (14) time all the valves to open simultaneously but for different lengths of time. The flow of gas supplied to the simple or compound filter is accordingly divided into subsidiary streams, one or more of which is discontinued before the other or others.

14 Claims, 2 Drawing Sheets

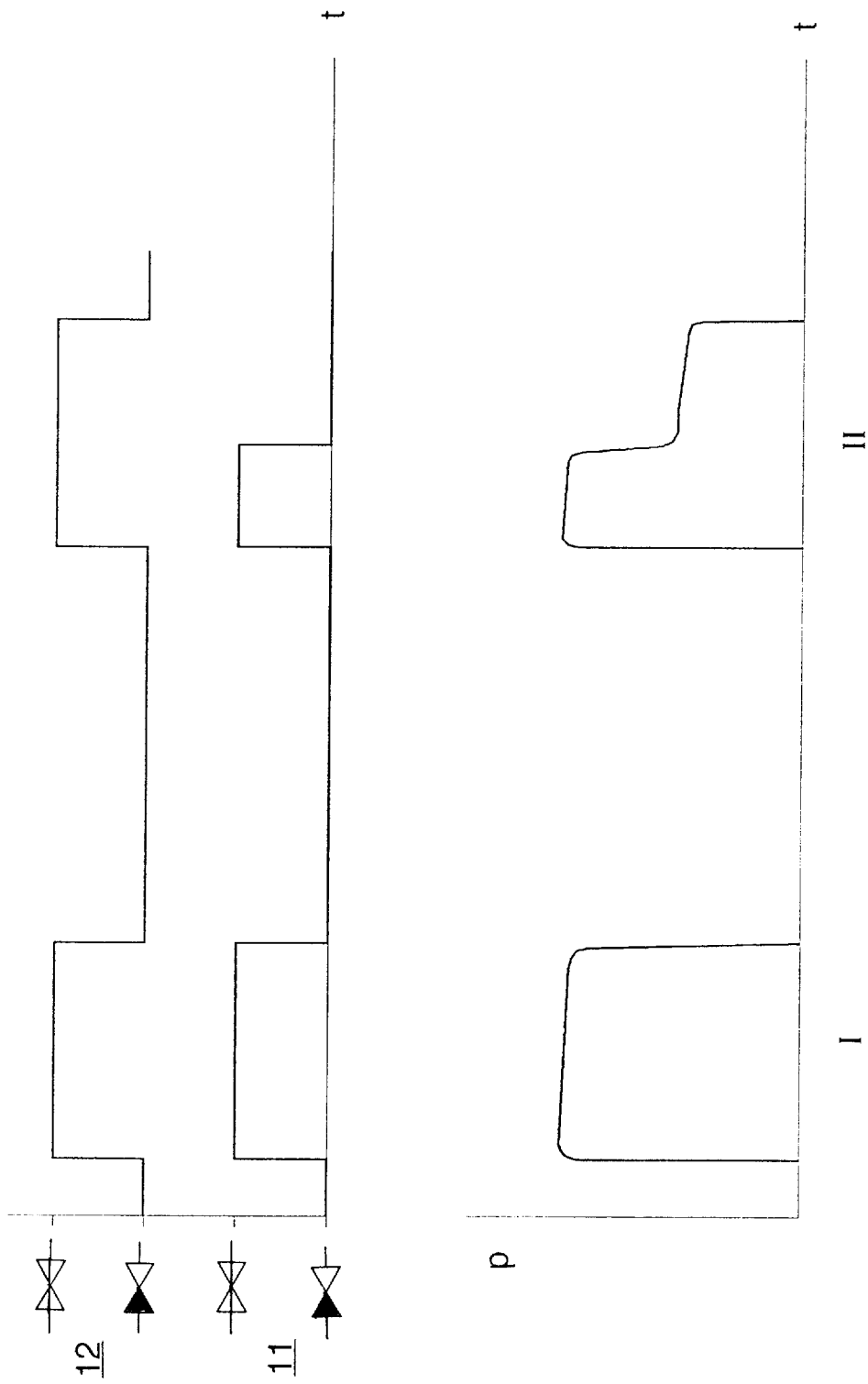

DEVICE FOR AND METHOD OF UNCLOGGING FILTERS

BACKGROUND OF THE INVENTION

The present invention concerns a device for and a method of unclogging filters by means of lances that convey bursts of gas.

The filter-cleaning gas is obtained from a tank by way of a line in such a device. The line is protected by a one-way valve. A contaminated gas is filtered by conveying it through a simple or compound filter. The contaminated gas travels in one direction and bursts of a filter-unclogging gas in the opposite direction. The bursts knock the cake off the filters. How much unclogging gas travels through the filters depends on how large the valve is and how long it is open. If only a single line and valve is associated with every lance as in the device known from WIPO 88/07404, the rate of flow and the strength of the burst during the filter-cleaning phase will be invariable. A device of this kind is unreliable when employed with large compound filters and requires a large and expensive supporting framework.

SUMMARY OF THE INVENTION

The object of the present invention is to make the generic device more effective and adaptable to various processing parameters.

The variation in timing of the parallel valves makes it possible to regulate the bursts of filter-unclogging gas over time. If all the valves are open when the filter unclogging begins, the increased flow will increase the pressure of the bursts and release the cake from the filter. If the size of the valve is invariable, the timing will dictate how many bursts get through, a parameter that can be controlled by the number and size of parallel valves. With one valve closed and the others open, the bursts will be weaker. They will, however, still be powerful enough to prevent the dust from accumulating again on the previously cleaned filter. The force of the burst and the amount of gas consumed can accordingly by optimally adjusted and adapted to the filters' processing parameters. The device in accordance with the present invention also allows the use of relatively compact filter-supporting frames long enough for effecting unclogging.

BRIEF DESCRIPTION OF THE DRAWINGS

One embodiment of the present invention will now be specified with reference to the accompanying drawing, wherein FIG. 1 schematically illustrates the principle behind a device for unclogging filters and FIG. 2 illustrates a typical sequence of bursts over time.

DESCRIPTION OF THE PREFERRED EMBODIMENTS

Figure 1:
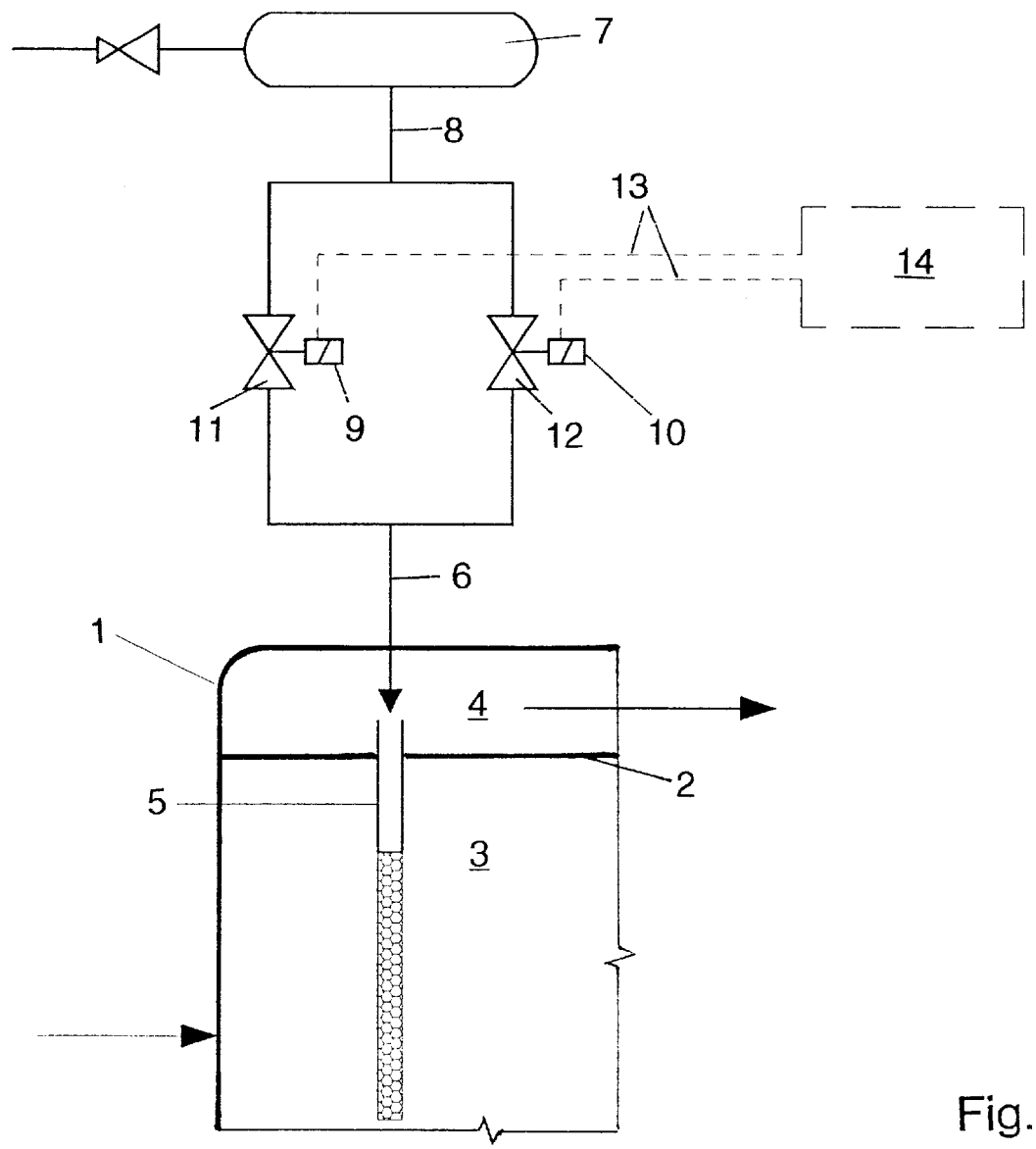

Part of a compound filter for filtering a raw and dusty gas is schematically illustrated. The filter constitutes a holder 1 divided by a perforated partition 2 into a raw-gas section 3 and a filtered-gas section 4. Filters in the form of candles 5 or socks are suspended from partition 2. Candles 5 extend into raw-gas section 3 with their open end communicating with filtered-gas section 4. The contaminated gas enters raw-gas section 3 through an intake and flows through candles 5 while the dust accumulates on their outer surfaces. The clean gas enters filtered-gas section 4 and leaves through an outlet.

Filtered-gas section 4 can consist of channels that extend through holder 1 with candles 5 mounted upright on them. The candles can in that event be combined into groups with a common exit for the filtered gas. A filter of this type filters out the dust and is then unclogged essentially like the filter illustrated in FIG. 1.

The dust accumulating on candles 5 must be removed from time to time. Bursts of a filter-unclogging gas are for this purpose introduced into candles 5 in opposition to and at a higher pressure than the gas being processed. The filter-cleaning gas is stored in a tank 7, and each lance 6 is supplied therefrom by way of an associated line 8.

Each filter cleaning-gas line 8 is protected by several valves 11 and 12. Valves 11 and 12 are controlled by drive mechanisms 9 and 10. A burst of gas is supplied to each lance 6 when the valves are open. The volume of gas in each burst depends on the size of the valve and on how long it remains open. Valves 11 and 12 are parallel and share an intake and outlet. The mechanisms that control the valves are connected by cables 13 to, and controlled by, controls 14.

All valves 11 and 12 are timed to open at the same time and to remain open for a specific length of time, 100 msec for example. Valve 11 then closes while valve or valves 12 remain open, closing after a total of 200 msec for example.

FIG. 2 illustrates different timing sequences for valves 11 and 12. The upper graph represents the operating positions (open or closed) of valves 11 and 12 as a function of time t. The lower graph illustrates the associated pressure p of the bursts over time.

In case I, the two valves 11 and 12 illustrated in FIG. 1 remain open for the same length of time. The result is practically twice as much flow as through only one open valve. The pressure remains essentially the same. When on the other hand valves 11 and 12 are actuated at the same time but for different lengths of time in accordance with the present invention (case II), the sequence will be different. A more powerful burst will initially be exerted to loosen the cake adhering to candles 5. When valve 11 closes, the lower pressure will prevent the dust from accumulating on the filter again. Minimal filter-unclogging gas will accordingly be needed.

We claim:

1. An arrangement for cleaning filter elements held within a filter vessel for filtering a medium, comprising: cleansing lances transmitting a gas pulse to at least one filter element within-said vessel; a gas pulse source and a single gas pulse line connected to each of said lances; at least two valves in said single gas pulse line, said single gas pulse line being connected between said source and said lances; said two valves being connected in parallel so that entrances of said valves are connected together and exits of said valves are connected together; control means connected to said valves for actuating said two valves at the same instant of time and for different durations to transmit different pulse durations by said two valves; said lances transmitting cleansing gas at substantially constant pressure, said cleansing gas being transmitted from said source to said lances through at least two flow branches connected in parallel, each of said branches having one of said valves; said control means controlling said valves for closing one of said valves before closing the other one of said valves, flow of cleansing gas through said valves and said branches being stopped when said valves are closed; said gas pulse being at a substantially higher pressure than said medium to be filtered, said gas pulse having a substantially higher pressure when said valves are open than when said valves are closed, cleansing gas transmitted to said lances being reduced when one of said valves is closed and said gas pulse having thereby a reduced pressure for preventing redeposit of dust on said filter element after said dust has been previously removed.

2. An arrangement as defined in claim 1, wherein said at least one filter comprises a group of filter elements.

3. An arrangement as defined in claim 1, including means for opening said valves for said different durations.

4. An arrangement as defined in claim 1, including means for closing one valve and holding the other valve open for a specific time interval and then closing said other valve.

5. An arrangement as defined in claim 4, including means for closing said one valve 100 msec after being open and said other valve remains open for said specific time interval and is then closed after a total expiration of 200 msec.

6. An arrangement as defined in claim 1, including means for reducing an amount of gas pulse transmitted to said filter element through the respective lance when one of said valves is closed after a specific interval for producing a reduced pressure pulse preventing redeposition of dust onto said filter element.

7. A method for cleaning filter elements, comprising the steps of: transmitting a gas pulse at elevated pressure to at least one filter element, said gas pulse being carried by a single gas pulse stream; dividing said single gas pulse stream into a plurality of parallel branch streams; actuating said parallel branch streams to commence transmitting by all said branch streams at the same time and for different durations to transmit different pulse durations by said branch streams; transmitting all branch streams to said at least one filter element over a specific time interval; switching off at least one of said branch streams before at least one of the remaining branch streams; said gas pulse stream having a substantially constant pressure, cleansing gas being transmitted to said filter element in reduced amount when one of said branch streams is switched off and said gas pulse has thereby a reduced pressure for preventing redeposit of dust on said filter element after said dust has been previously removed.

8. A method as defined in claim 7, wherein said at least one filter element comprises a group of filter elements.

9. A method as defined in claim 7, wherein said plurality of branch streams comprises two branch streams with valves opened for different durations.

10. A method as defined in claim 9, wherein one valve is open for a specific interval and then closes and the other valve is open for an interval greater than said specific interval and then closes.

11. A method as defined in claim 10, wherein said one valve closes 100 msec after having been opened and said other valve remains open and then closes after a total expiration of 200 msec. filter.

12. An arrangement as defined in claim 1, wherein said gas pulse line has means for delivering said gas pulse for releasing caking deposited on said filter element has a pressure greater than the pressure of the medium to be filtered.

13. An arrangement for cleaning filter elements held within a filter vessel, comprising: cleansing lances transmitting a gas pulse to at least one filter element within said vessel; a gas pulse source and a gas pulse line connected to each of said lances; at least two valves in said gas pulse line, said gas pulse line being connected between said source and said lances; said two valves being connected in parallel so that entrances of said valves are connected together and exits of said valves are connected together; control means connected to said valves for actuating said two valves at the same instant of time and for different durations to transmit different pulse durations by said two valves; said at least one filter element comprising a group of filter elements; means for opening said valves for said different durations; means for closing one of said valves and holding open the other of said valves for a specific time interval and then closing the other of said valves; means for closing said one valve 100 msec after being open and said other valve remaining open for said specific time interval and is then closed after a total expiration of 200 msec; said lances transmitting cleansing gas at substantially constant pressure, said cleansing gas being transmitted from said source to said lances through at least two flow branches connected in parallel, each of said branches having one of said valves; said control means controlling said valves for closing one of said valves before closing the other one of said valves, flow of cleansing gas through said valves and said branches being stopped when said valves are closed; said gas pulse being at a substantially higher pressure than said medium to be filtered, said gas pulse having a substantially higher pressure when said valves are open than when said valves are closed, cleansing gas transmitted to said lances being reduced when one of said valves is closed and said gas pulse having thereby a reduced pressure for preventing redeposit of dust on said filter element after said dust has been previously removed.

14. A method for cleaning filter elements, comprising the steps of: transmitting a gas pulse at elevated pressure to at least one filter element, said gas pulse being carried by a single gas pulse stream; dividing said single gas pulse stream into a plurality of parallel branch streams; actuating said parallel branch streams to commence transmitting by all said branch streams at the same time and for different durations to transmit different pulse durations by said branch streams; transmitting all branch streams to said at least one filter element over a specific time interval; switching off at least one of said branch streams before at least one of the remaining branch streams, said at least one filter element comprising a group of filter elements, said plurality of branch streams comprising two branch streams with valves opened for different durations of time, one valve closing and the other valve remaining open for a specific time interval and then closing, said one valve closing 100 msec after having been opened and said other valve remaining open for said specific time interval and then closing after a total expiration of 200 msec; said gas pulse stream having a substantially constant pressure, cleansing gas being transmitted to said filter element in reduced amount when one of said branch streams is switched off and said gas pulse has thereby a reduced pressure for preventing redeposit of dust on said filter element after said dust has been previously removed.

* * * * *